June 20, 1933.  O. BOYD  1,915,010
GUARD FOR REAR VIEW MIRRORS
Filed June 11, 1932
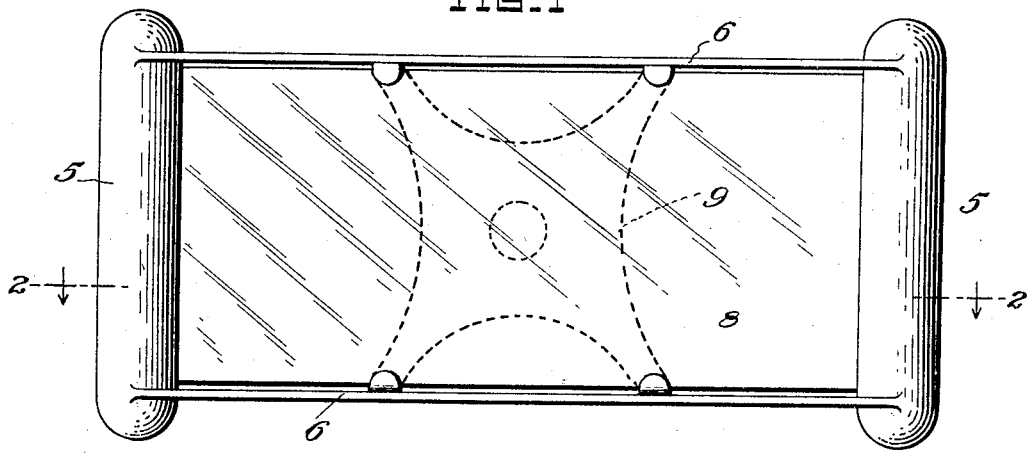
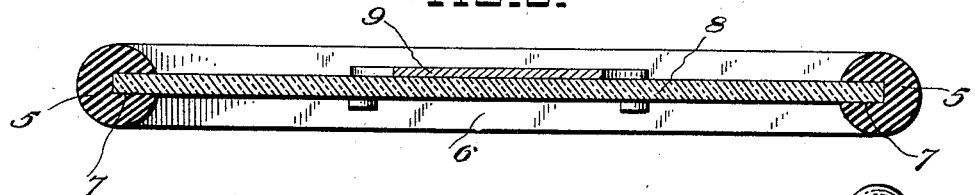
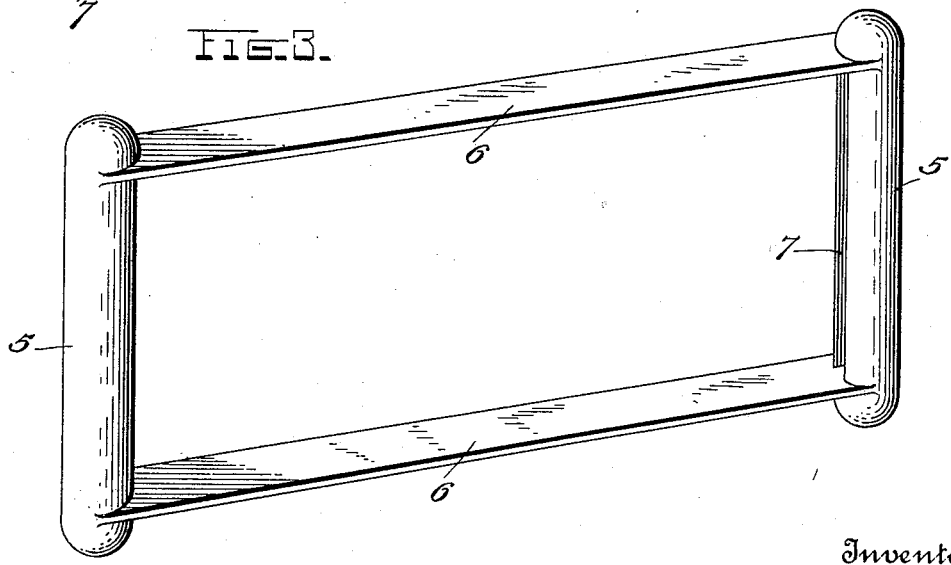
Inventor
Orville Boyd Patented June 20, 1933

1,915,010

UNITED STATES PATENT OFFICE

ORVILLE BOYD, OF STRONGHURST, ILLINOIS

GUARD FOR REAR VIEW MIRRORS

Application filed June 11, 1932. Serial No. 616,706.

The invention aims to provide an exceptionally simple and inexpensive, yet an effective guard for the conventional rear view mirrors of automobiles, to prevent anyone entering, riding in or leaving the machine, from becoming injured due to accidentally bumping against or being thrown against said mirror.

With the foregoing in view, the invention resides in the novel subject matter hereinafter described and claimed, description being accomplished by reference to the accompanying drawing.

Fig. 1 is an elevation showing the guard applied to a mirror.

Fig. 2 is a horizontal sectional view on line 2—2 of Fig. 1.

Fig. 3 is a perspective view of the guard detached.

The device comprises two vertically elongated resilient bumpers 5 connected by elastic members 6 near their upper and lower ends, said bumpers being provided in their inner opposed sides with grooves 7 to receive the ends of a traffic or rear view mirror 8 which is supported by the conventional bracket 9. In the preferred construction, the bumpers 5 are formed from rubber and the elastic connectors 6 are formed from rubber strips, said bumpers and strips being integrally connected with each other. Preferably, the ends of the bumpers 5 project respectively above and below the upper and lower strips 6, giving a surplus of protection at the sharp corners of the mirror 8. While the bumpers 5 are comparatively large and heavy, the strips 6 are thin and flat, and highly elastic. Not only do these strips stretch to allow application of the guard to mirrors of various lengths, but they serve to effectively hold the two bumpers in place upon the ends of the mirror. The bumpers 5 are relatively stiff and therefore the pull of the elastic strips 6 upon them will have little or no tendency to bow them out of straight form.

It will be seen from the foregoing that the device is simple and inexpensive, may be quickly and easily applied, and will form an effective protection to prevent persons from possibly injuring themselves upon the rear view mirrors of various kinds of vehicles.

I claim:—

1. A rear view mirror guard comprising two vertically elongated resilient bumpers having grooves in their inner opposed sides to receive the ends of the mirror, and upper and lower elastic members connected at their ends with the upper and lower ends of said bumpers respectively, said elastic members allowing various spacings of said bumpers for mirrors of different lengths, serving to hold said bumpers in engagement with the mirror ends, and constituting the sole connecting means between said bumpers.

2. A structure as specified in claim 1; said bumpers extending above and below the ends of said elastic members respectively.

3. A structure as specified in claim 1; said elastic members and said bumpers being all formed of rubber and integrally connected with each other.

In testimony whereof I affix my signature.

ORVILLE BOYD.